Oct. 7, 1958   A. P. DOUGLAS ET AL   2,855,219
GIRL'S BICYCLE FRAME
Filed June 20, 1957   2 Sheets-Sheet 1
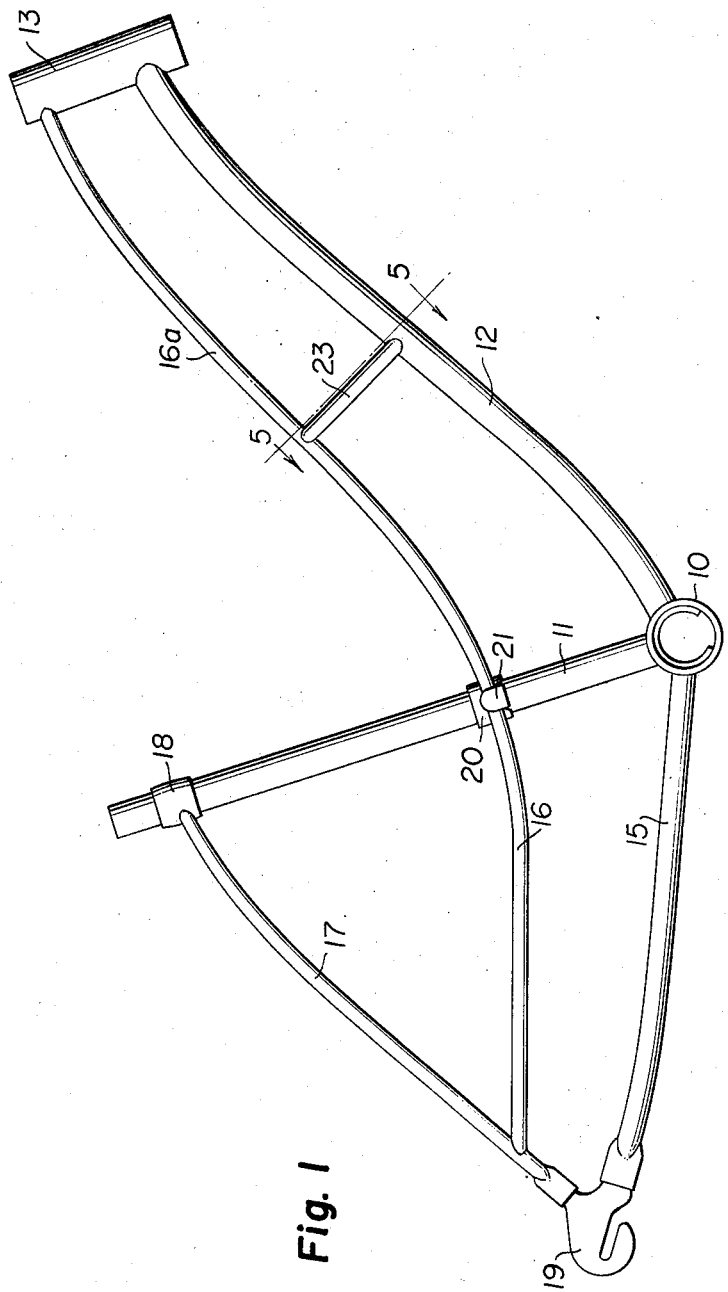
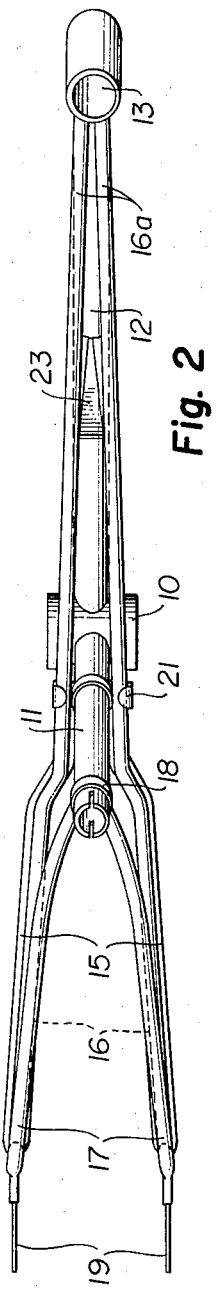
INVENTORS
ALVIN P. DOUGLAS
GILBERT B. HAHN
BY Golrick & Golrick
ATTORNEYS Oct. 7, 1958    A. P. DOUGLAS ET AL    2,855,219
GIRL'S BICYCLE FRAME
Filed June 20, 1957    2 Sheets-Sheet 2
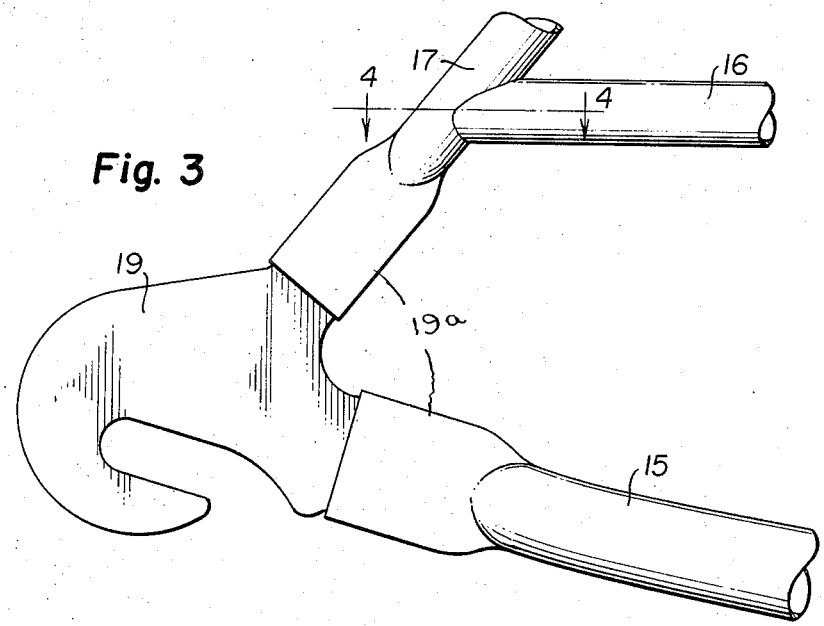
Fig. 3
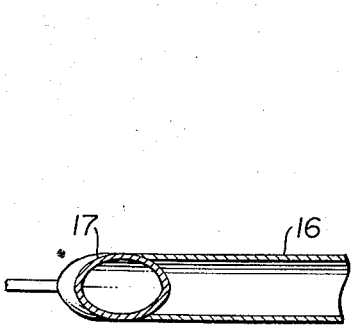
Fig. 4
Fig. 5
INVENTORS
ALVIN P. DOUGLAS
GILBERT B. HAHN
BY 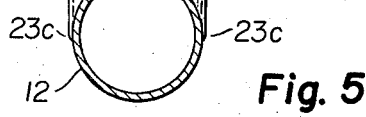
ATTORNEYS

United States Patent Office 2,855,219
Patented Oct. 7, 1958

2,855,219

GIRL'S BICYCLE FRAME

Alvin P. Douglas, Cleveland Heights, and Gilbert B. Hahn, Lyndhurst, Ohio, assignors to The Murray Ohio Manufacturing Company, Cleveland, Ohio, a corporation of Ohio Application June 20, 1957, Serial No. 666,885

1 Claim. (Cl. 280—281)

This invention is directed to improvements in girls' bicycle frames and has for its general object the provision of a girl's bicycle frame having a triple rear fork construction.

A more specific object of the present invention is the provision of a bicycle tubular frame structure which will be modern in appearance and sturdy in construction and of such design that the manufacture of the frame may be effected by a simultaneous copper brazing of all of the prefitted elements constituting the frame.

More specifically the invention is directed to the provision of a third rear fork construction in a girl's type tubular bicycle frame in the form of two tubes which are extended in straddled relation forwardly past the seat post mast tube to the head steering fork bearing tube thereby to form upper front reach tubes of the frame.

Other objects and advantages of the invention will appear from the description and drawings wherein:

Fig. 1 is a front elevational view of the frame incorporating the invention;

Fig. 2 is a plan view of the frame structure shown in Fig. 1;

Fig. 3 is an elevational view of a rear axle clip plate;

Fig. 4 is a cross sectional detail taken along the line 4—4 of Fig. 3;

Fig. 5 is a cross sectional view taken along a plane indicated by the line 5—5 in Fig. 1.

Heretofore girls' bicycle frames have been constructed with a pair of rear lower fork tubes connected to hanger housing and rear axle clip plate and a rear upper pair of tubes connected to the plate and a seat post mast tube cluster. In the instant application a third rear fork structure is provided and disposed between the two aforesaid fork structures in such manner that the tubes thereof may be connected to the upper rear fork tubes and extend forwardly in a continuous manner in straddled relation past the mast tube to connections with the steering fork bearing head tube thereby to form also a frame with twin upper forward reach tubes which are truss connected to the front lower reach tube and individually connected to the head tube by being press fitted in openings formed in the head tube.

Referring to the drawings in Fig. 1 the reference numeral 10 designates a hanger housing in the form of a tube and the wall of which is perforated and reamed to receive the lower end of a mast tube 11. A lower front reach tube 12 and rear lower fork tubes 15 are fitted to the hanger housing tube 10 in like manner. The forward upper end of the lower reach tube 12 is fitted in similar fashion to the head tube 13.

The mast tube 10 is supported at the top region thereof by upper rear fork tubes 17 extending into reamed openings formed in a seat post cluster member 18 pressed on the mast tube. The lower ends of the upper rear fork tubes 17 are formed into socket formations 19a to fit on the rear axle clip plates 19.

Intermediate the lower rear fork tubes 15 and the upper fork tubes 17 is a third pair of fork tubes 16 connected at the rear ends thereof to the rear upper fork tube members 17 adjacent the socket formations 19a fitting on the rear axle clip plates 19. The tubes 16 are shaped in an upward sweep to a cluster member 20 in the form of a sleeve pressed upon the mast tube and located intermediate the seat post cluster 18 and the hanger hub or housing 10.

The cluster sleeve 20 is provided with clip portions 21 integrally formed in depending fashion to conform to the outer diameter of the intermediate fork tubes 16. These tubes are shaped to pass the mast tube at each side thereof and are extended upwardly to the head tube 13 to form twin upper front reach tubes 16a. These tube portions 16a align horizontally and the upper ends thereof are pressed into individual openings formed in the head tube 13.

Intermediate the hanger housing and the head tube strut member 23 is disposed between the lower front reach tube 12 and the tube extensions 16a as shown in Fig. 5 as a V-shaped member having the sides thereof curled inwardly to form tube portions 23a. The width of the V at the top is such that the upper ends of the tubular formations may be cut to complement the outer surfaces of the twin tubes 16a with spot welding nibs 23b disposed at the sides of the tubes 16a. The bottom of the strut member 23 including the tubular ends is contoured to fit the upper half surface of the front reach tube 12 with nib extensions 23c disposed against the opposite sides of tube 12.

After the frame is formed in the manner described a simultaneous copper brazing of all of the prefitted and spot welded joints may be effected in the known manner.

We claim:

In a girl's bicycle frame having a steering fork bearing head tube, a crank hanger hub, a mast tube connected to the hanger hub, a lower front tube connecting the hanger hub and the fork bearing head tube, upper rear fork tubes connected to the mast tube which is connected to the hanger hub, and lower rear fork tubes having rear axle plates connected thereto, said rear upper fork tubes being connected to the axle plates; two spaced apart upper tubes each tube being individually connected to the head tube by being press fitted into individual spaced apart openings formed in the head tube, said two tubes extending from the head tube downwardly and rearwardly past the mast tube to the lower regions of the upper rear fork tubes, the rear ends of the two tubes being concavely formed to fit the outer surfaces of the upper rear fork tubes adjacent the connection between the upper fork tubes and the axle plates with each tube being joined to a rear upper fork tube, said two tubes having a strut connection with the lower front tube located between the head tube and the mast tube consisting of a single V-shaped plate having the V margins thereof curled into tubular shapes with the upper tubular ends concavely shaped and fitted to the under half sides of the circumference of the two tubes and the lower converged ends of the tubular shapes being concavely formed and joined to substantially half the circumference of the lower front tube, the two tubes with respect to the head tube, the front lower tube and the upper rear fork members being connected by spot welds and all of said connections being simultaneously copper brazed.

References Cited in the file of this patent

UNITED STATES PATENTS

| | | |
|---|---|---|
| 2,443,008 | Kraeft | June 8, 1948 |
| 2,755,103 | Douglas | Mar. 9, 1953 |

FOREIGN PATENTS

| | | |
|---|---|---|
| 1,025,770 | France | Jan. 28, 1953 |
| 1,037,370 | France | Apr. 29, 1953 |
| 863,306 | Germany | Jan. 15, 1953 |